(No Model.)
E. B. STUART.
COMPOUND FOR SEPARATING OXYGEN AND METHOD OF MAKING SAME.
No. 588,613. Patented Aug. 24, 1897.
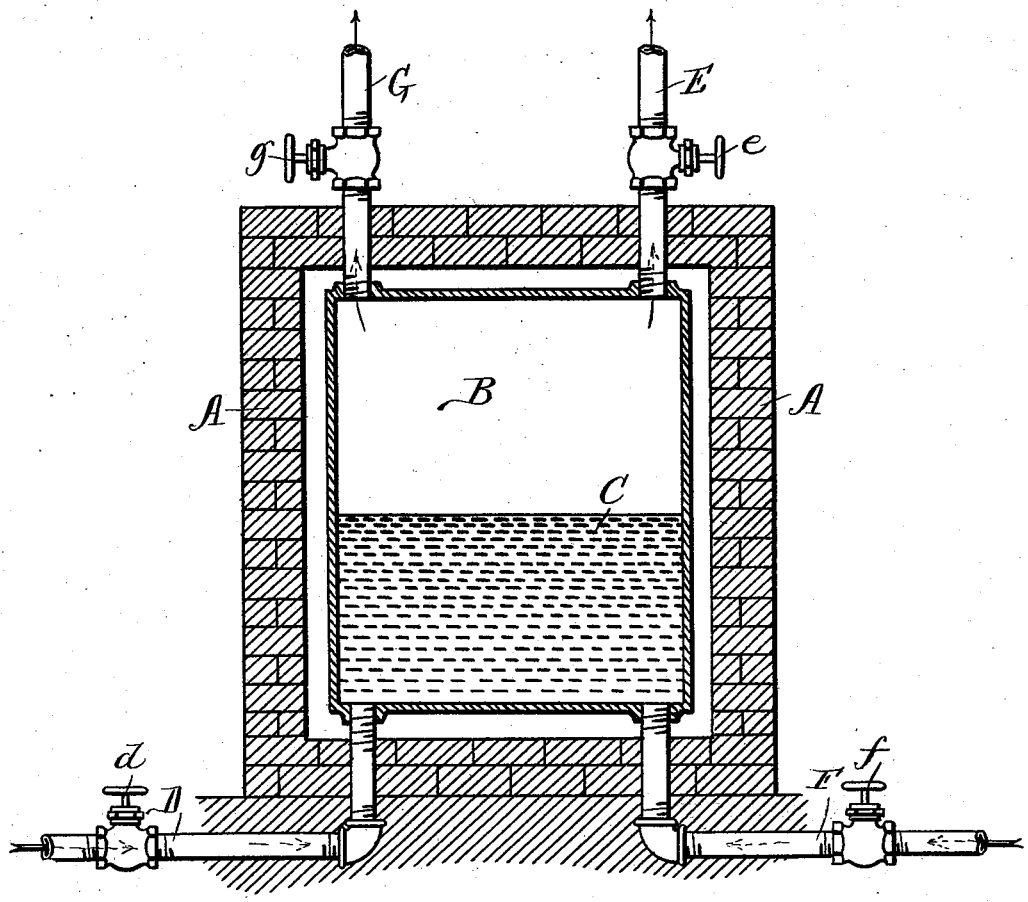

UNITED STATES PATENT OFFICE.

ERNEST B. STUART, OF CHICAGO, ILLINOIS, ASSIGNOR TO THE GENERAL GAS COMPANY, OF SAME PLACE.

COMPOUND FOR SEPARATING OXYGEN AND METHOD OF MAKING SAME.

SPECIFICATION forming part of Letters Patent No. 588,613, dated August 24, 1897.

Application filed November 23, 1895. Renewed December 24, 1896. Serial No. 616,942. (No specimens.)

*To all whom it may concern:*

Be it known that I, ERNEST B. STUART, a citizen of the United States, residing at Chicago, in the county of Cook and State of Illinois, have invented certain new and useful Improvements in Preparations for Use in Obtaining Oxygen and Nitrogen and Methods of Making and Using the Same, of which the following is a full, clear, and exact specification.

This invention relates generally to improvements in preparations and the method of preparing and using the same for obtaining oxygen and nitrogen from air by bringing the air into contact with the chemical agents which will absorb oxygen or with which oxygen will combine and to which nitrogen is indifferent and therefore passes off and from which the oxygen is afterward released when the preparation is subjected to the influence of steam, thus leaving the chemicals or ingredients of the preparation in the form they were before having oxygen combined therewith; but more specifically my invention relates to oxygen-absorbing substances in which the active agent is manganate of soda formed by a mixture of oxid of manganese and caustic soda.

It has long been well known that the economical production of oxygen for commercial use would be of great commercial value because of the capacity of oxygen for producing high temperatures and intense light in the combustion of other substances and gases, as well as for a multiplicity of uses in the arts and sciences, and that the atmosphere or air is the most available and practical source from which to obtain it.

Nearly thirty years ago one Tessie du Motay discovered by laboratory investigations and therefrom at that time disclosed to the world that a mass of oxid of manganese and caustic soda at an incipient red heat (about 300° centigrade) would combine with oxygen from the air and water would be separated, and that steam at a temperature of 450° centigrade passed through the manganate of soda thus formed would evolve oxygen therefrom and at the same time regenerate oxid of manganese and caustic soda, but no one prior to my invention and discovery has been able to utilize with commercial success manganate of soda or a manganate of any form for the production of oxygen or nitrogen, although ever since Tessie du Motay's discovery the desirability of manganate of soda for that purpose has been recognized to a world-wide extent and numerous unsuccessful efforts have been made to so use it, as is shown by the literature on the subject.

Now manganate of soda, accurately speaking, is formed by combining ten parts, by weight, of caustic soda with eleven parts of binoxid of manganese and eight parts of oxygen at a temperature of about 300° centigrade, and in forming at this temperature water separates out and is expelled, and coincident therewith manganate of soda is formed according to the following reaction:

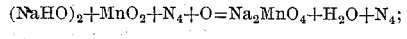

$$(NaHO)_2 + MnO_2 + N_4 + O = Na_2MnO_4 + H_2O + N_4;$$

but when steam at a temperature of about 300° degrees centigrade and above is brought in contact with said manganate of soda a mutual decomposition takes place, and as a result oxygen is evolved, leaving the original mixture of caustic soda and oxid of manganese. A manganate of soda when so formed possesses marked advantages over any other agent for producing, commercially, oxygen and nitrogen, for the reason that it will produce more oxygen per pound than can be produced at the present time from any other known agent, that caustic soda and oxid of manganese are found in commerce in a higher degree of purity and are cheaper and more available in large quantities than any other material for the production of a manganate, that caustic soda is less volatile than any other of the alkalies, and that the use of binoxid of manganese facilitates the production of a manganate, in that a manganate is thereby produced at one operation, while, on the other hand, other oxids or salts of manganese are indirect, because more than one operation is required.

Theoretically, upon the assumption that every molecule of any given body of a manganate of soda is exposed to steam and air, every pound of chemically-pure manganate of soda is capable of yielding one cubic foot of oxygen for every reaction; but in practice this yield is impossible because manganate of soda is an impenetrable solid, and therefore this yield can only be proportionate to the surface of the manganate exposed to steam and air.

In efforts to successfully utilize a manganate of soda for producing oxygen a weight or bulk of it sufficient for commercial use has been reduced to particles or granules of a size permitting the free circulation of air and steam therethrough, and by this means provides such a bulk of manganate of soda with the largest possible extent of surface consistent with its solid form. Manganate of soda, however, is a salt soluble in water, and as steam is water it not only performs the chemical function of liberating oxygen from a manganate, but at the same time, by its physical action, dissolves the manganate with the result that, in the process as heretofore practiced, the granules are rendered less and less solid after every reaction and the adjacent granules or particles caused to so quickly merge the one into the other that before any substantial volume of oxygen has been produced the multitude of granules have consolidated into a single viscid mass impenetrable to air and steam. This resulting impenetrability by air and steam and the deterioration of the surface at every reaction have heretofore so generally been recognized by others in efforts to successfully utilize Tessie du Motay's discovery that various means have been devised for so disposing the manganate as to increase its surface—namely, by placing the manganate in a number of shallow pans arranged one above the other in a retort; by coating porus substances, such as pumice-stone, with the manganate in the form of a viscid mass; by mixing it with infusible and insoluble substances, such as kaolin, and by first granulating the manganate and then dusting it with oxid of copper; but none of these efforts have been successful for many reasons, among which may be mentioned that in the use of shallow pans it is practically impossible with commercial economy to raise their contents to the degree of heat necessary for manganate to successfully evolve oxygen, which expense, moreover, is increased by the untimely destruction of the only practical form of retort—namely, iron; that pumice-stone is too poor a conductor of heat, while kaolin lacks the necessary porosity to enable the successful distribution of air and steam to the manganate therein contained, and that a coating of oxid of copper not only reduces the penetrability of the granules to air and steam, but, on the contrary, quickens their viscosity, and, furthermore, does not contain sufficient resistance to maintain the integrity of said granules, and as a result they very soon coalesce.

From the foregoing it will be understood that the manganese and the alkali or soda require a certain degree of heat to cause them to combine in the form of a manganate, and in so doing they absorb or combine with a certain amount of oxygen, and if this manganate is thereafter subjected to steam the oxygen is liberated or evolved from each molecule of the manganate with which the steam comes into contact; but this result cannot occur unless the mass be reduced to a practically non-volatile liquid, so that the steam may reach every molecule and at the same time the consistence of the mass will be unchanged, and it is also evident that this liquefaction of the mass must occur at a temperature below that which decomposes steam, because otherwise the steam when subjected thereto would be resolved by the heat into its component gases, which are not capable in such form of effecting the regeneration or reconversion of the manganate into its uncombined ingredients and the consequent liberation of the oxygen absorbed by or combined therewith, and, on the other hand, the temperature of the mass must be above that at which steam forms, because otherwise the steam would be condensed, and hence produce the same objectionable result as water, as heretofore explained.

Therefore it is the object of my invention, generally stated, to produce a preparation of any character which will absorb or combine with and liberate oxygen without physical change; to produce a preparation of any character which will freely combine with oxygen and as freely liberate the same under the influence of steam; to produce a practically non-volatile liquid preparation of any character which will combine with and liberate oxygen; to produce a liquid preparation which will combine with and liberate oxygen without physical change; to produce a liquid preparation of any character from which oxygen can be liberated by the action of steam; to produce a preparation of such a character that every portion of any weight or bulk thereof shall be permanently accessible to a maximum degree to the alternate action of air and steam for an indefinite time without any reduction in the capacity of the active agent of said preparation, whereby oxygen may be produced by a regenerative process; to produce a preparation which when subjected to air will combine with oxygen and liberate said oxygen when subjected to the influence of steam, leaving the chemical after its subjection to said steam in the physical condition it was before being sujected to air, whereby such alternate actions may be carried on indefinitely without deteriorating that property of the chemicals which enables them to absorb or combine with and liberate oxygen under the alternate influence of air and steam.

More specifically stated, the object of my invention is to produce a preparation containing a manganate, the said preparation being of such a character that oxygen may be combined with every portion of the manganate contained in any quantity or body of said preparation and released therefrom by the action of steam and this alternate operation be repeated indefinitely without any deterioration or change in the consistence of the preparation, and as a result said preparation embraces all of the advantages due to the use of any manganate in the production of oxygen and with an absence of the disadvantages heretofore attending the use of the manganates, and, still more specifically, to produce a preparation containing manganate of soda, the said preparation being of such a character that oxygen and steam may alternately be combined with every portion of the active principle thereof in any quantity or body of the said preparation and this operation be repeated indefinitely without any deterioration or change in the consistence of the preparation, whereby said preparation shall embrace all of the advantages of which a manganate of soda is capable in the production of oxygen and with an absence of all of the disadvantages heretofore attending its use; and my invention has for its object generally to maintain an oxygen and nitrogen separating substance in a liquid and practically non-volatile state while the same is being subjected to the action of alternate currents of air and steam and at the same time avoid any material condensation of the steam thereby.

Now to accomplish these objects I produce an oxygen-absorbing substance which may be maintained in a fused liquid state at a degree of temperature so low that when subjected to the action of steam in the process of producing oxygen from atmospheric air the steam will not be decomposed by the heat, but will effectually perform its desired function of reconverting the oxygen-absorbing substance into its component ingredients or elements and thereby liberate the oxygen from the fused and liquid mass and render the latter susceptible of again absorbing or combining with more oxygen.

After various experiments in efforts to successfully utilize a manganate of soda for producing oxygen and nitrogen I finally discovered that when to oxid of manganese there is added caustic alkali in a certain excess of that necessary for forming a manganate of soda, and the temperature of this mixture is then raised to that at which the reaction occurs and the magnate is formed, liquefaction takes place, and said liquid is ever afterward non-volatile and in physical form and chemical function is unchanged by the action of either air or steam, and as a result a preparation is produced in which a manganate or the elements thereof are held permanently in a fused and liquid mass and in such form that every molecule thereof is permanently accessible to a maximum degree to the alternate action of air and steam and thereby rendered capable of indefinitely absorbing or combining with oxygen to its fullest capacity and as completely releasing it and again absorbing more oxygen when subjected alternately to the influence of steam and air.

This liquid manganate will produce oxygen in a greater degree of purity than the same chemical in its solid form, for the reason that the liquid possesses no interstices in which air can remain to act as a diluent, while, on the other hand, the interstices between the particles of the chemical in its solid form retain the air to such an extent that the production of pure oxygen is impossible without the adoption of some extraneous means for removing the air so retained.

In carrying out my invention I may employ any oxygen-absorbing substance, to which I add a sufficient quantity of some fusible material that will be non-volatile at a temperature between that at which steam forms and that at which it decomposes by heat and will hold in solution the said oxygen-absorbing substance and render the mass liquid at a temperature between the said extremes; but for the first-named ingredient I prefer to use an oxid of manganese, or salt of manganese, or some other compound of manganese, which, when combined with alkali, constitutes the oxygen-absorbing substance and produces a manganate or permanganate, and as a solvent for dissolving or liquefying this I employ a sufficient quantity of any alkali or any of the alkaline or neutral salts (which may be found suitable for producing a non-volatile liquid manganate) to make the mass sufficiently liquid to enable the air and steam introduced therein while within the range of the above-named temperatures to intimately commingle therewith or permeate every particle thereof and evolve the oxygen therefrom. In practice, however, I have found it best to use for economy in the production of my liquid chemical about twenty-four parts, by weight, of commercial binoxid of manganese and about seventy-six parts, by weight, of commercial caustic soda, (which is less volatile than any other alkali,) these proportions varying with the impurities contained, but representing about twenty parts of binoxid of manganese, chemically pure, and about fifty-eight parts of pure caustic soda, for when this mixture is heated to about 300° centigrade there is thereby produced a liquid having a maximum capacity for minutely commingling with steam and air and thereby separating the oxygen and nitrogen from the latter.

The formula $Na_2MnO_4 + (NaHO)_4$ will approximately express the relation between the sodic manganate formed and the free or uncombined sodic hydrate remaining when these proportions are employed, and the reactions of decomposition and regeneration by which oxygen and nitrogen are separated can be expressed as follows:

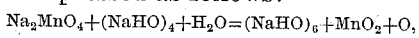

and in regenerating the manganate under the influence of an air-blast:

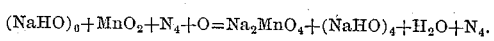

So long as the caustic soda in excess of that sufficient to form a manganate of soda bears such proportion to the manganate as to cause the mass to liquefy at a temperature below that at which steam decomposes by heat these proportions may be varied without departure from my invention; but the effect of increasing the alkali or other solvent for the oxygen-absorbing substance or manganate beyond that already specified is that fluidity is increased and the melting-point of the manganate reduced, and this result is accomplished at the expense of retort-space and a reduced percentage of yield of oxygen to a given bulk or weight of the liquid compound; and if, on the other hand, the proportion of alkali or solvent is reduced and the liquid correspondingly thickened then air and steam have not the same free access thereto without the employment of a higher degree of heat than is necessary for the reaction and without danger of necessitating that the substance, in order to be rendered fluid, be subjected to a degree of heat that will decompose the steam, and if this degree be necessary to produce liquefaction the preparation cannot be employed for evolving oxygen from air because the separated gases of steam or water are incapable of regenerating the manganate into its component elements, and without such regeneration or reconversion the manganate has not the property of absorbing more oxygen nor of evolving that which it contains. Hence it is a matter of vital importance that the proportion of alkali in excess be such as to produce fluidity of the mass at a temperature below that at which steam decomposes, an example of one of the varying proportions capable of accomplishing this result being, as before stated, about twenty-four parts, by weight, of binoxid of manganese and seventy-six parts, by weight, of sodic hydrate, which yield a manganate and an excess of alkali equal to about the weight of the manganate. In other words, while in theory one pound of chemically-pure manganate of soda will yield one cubic foot of oxygen for each reaction, this yield per pound of total bulk of my liquid compound is decreased in proportion as the excess of caustic alkali is added for the purpose of securing fluidity, and hence any greater or lesser fluidity than is absolutely necessary for a maximum free exposure of each and every molecule of the manganate to the action of air and steam is of no advantage.

As before stated, I prefer to use caustic soda for the reason that it is found in commerce in a high degree of purity, is cheaper, is more available in large quantities, and less volatile than any of the other alkalies, but my invention includes the use of any alkali and contemplates the use of any and all of the neutral salts which may be found suitable for producing a practically non-volatile liquid manganate. For the purposes, however, of the generic protection of my invention in its use of any form of manganese in connection with any of the well-known or suitable reagents for the production of a practically non-volatile liquid manganate I have filed February 7, 1896, another application, Serial No. 578,298, embracing and claiming the use of any of the neutral salts which, when used with any manganate, will produce a manganate possessing said characteristics. I also prefer to use binoxid of manganese because of its cheapness, commercial purity, and that its use facilitates the production of the desired manganate, but my invention includes any other oxid of manganese which, when combined with alkali, will produce a manganate or permanganate.

In practicing my invention the alkali and the manganese are placed in a suitable vessel and the temperature raised to the melting-point of the alkali, and as soon as liquefaction occurs an air-blast may be introduced to complete the formation of the manganate.

By the foregoing process I produce a preparation consisting of manganese in a state of molecular division or molecular disintegration and a dry liquid (as contradistinguished from an aqueous solution) solvent in which the manganese is held in permanent solution and in such a state that it does not precipitate even after the oxygen is driven from the manganate and the manganese returns to its original chemical state, because in the formation of a manganate in the described manner the chemism which occurs between the ingredients effects the separation of the molecules of the manganese, and when once separated they so remain in the caustic soda or solvent in permanent solution.

When using my compound for the production of oxygen and nitrogen, this vessel may also be provided with suitable means for the introduction of steam, but in practice I prefer, as soon as liquefaction takes place in an open vessel, to transfer the material to a retort provided with suitable means for alternately injecting air and steam through the liquid and to complete the formation of the manganate by first introducing an air-blast; but the manganate may be formed and oxygen produced therefrom by the use of any vessel or vessels now or hereafter devised and suited for that purpose, it being understood that my invention is not limited to the use of any particular vessel or apparatus for producing liquid manganate or evolving oxygen therefrom.

As before intimated, my invention and discovery is also adapted for the production of nitrogen, to which end the nitrogen, being indifferent to the manganate, passes the same and may be conducted to a suitable holder or other storage vessel.

In the accompanying drawing is illustrated a vertical section of one of many suitable devices for producing oxygen and nitrogen from a liquid manganate, in which drawing A indicates the walls of a furnace; B, a retort situated therein; C, a liquid manganate in said retort; D, an air-supply pipe provided with a suitable valve $d$, through which an air-blast may be introduced to the manganate; E, a discharge-pipe for the nitrogen, provided with a valve $e$; F, a steam-pipe provided with a valve $f$ for the supply of steam to the manganate, and G an oxygen-discharging pipe provided with a valve $g$.

In operating, the valve $f$ in the steam-pipe and the valve $g$ in the oxygen-discharging pipe are closed and the valve $e$ in the nitrogen-discharging pipe is open during the blast of air through the pipe D, but as soon as the liquid manganate is fully charged with oxygen, and after the poor air containing nitrogen has passed off through the pipe E, the valve $e$ thereof is closed, as is also the valve $d$ in the pipe D, and thereupon the valve $f$ is opened and steam at the proper temperature, passing through the pipe F, discharges into the liquid mass, liberating the oxygen, which then escapes through the pipe G, in which the valve has been opened with the commencement of the steam-supply.

For the want of a better term in describing my invention I have employed the terms "fused" and "fluid" with reference to the consistence of my compound or preparation, but such terms are only intended to include that liquefaction which exists without material volatilization at a temperature between that at which steam forms (or that which will not condense steam) and that which decomposes steam, and I disclaim any intention of employing said terms in any such generic sense as to include chemicals mixed with or held in suspension in water, for I am aware that the aqueous form of manganate combined with free alkali is not new, nor do I wish to claim the same.

It will also be noted that in describing my invention I employ the terms "absorb" and "combine" indifferently or indiscriminately with reference to the conduct of the so-called "oxygen-absorbing substance" upon the oxygen, or vice versa, for without attempting to decide whether the oxygen is actually combined with the preparation in a strict technical sense in every phase of my invention I regard the word "absorb" as the generic term, including any function of the preparation which enables it to separate the component elements of air and cling to or retain one while the other passes off.

It is of course true that nearly all substances are more or less volatile at sufficient heat, but the term "non-volatile" is employed herein in its popular sense and does not embrace those substances which volatilize under moderate heat, and particularly below the temperature at which steam forms.

Having thus described my invention, what I claim as new, and desire to secure by Letters Patent, is—

1. The herein-described preparation consisting of an oxygen-absorbing substance and a sufficient quantity of free caustic soda to cause the mass to liquefy at a temperature above that at which steam forms and to be maintainable in a liquid state at that temperature, substantially as set forth.

2. The herein-described preparation consisting of a manganate and a sufficient quantity of free fusible alkali to cause the mass to liquefy at a temperature above that at which steam forms and be maintainable in a liquid state at that temperature, substantially as set forth.

3. The herein-described preparation consisting at the outset of binoxid of manganese and caustic alkali sufficiently in excess of that necessary to form a manganate in the presence of oxygen and to cause the mass to liquefy at a temperature above that at which steam forms and to be maintainable in liquid state at that temperature, substantially as set forth.

4. The herein-described preparation consisting of binoxid of manganese and caustic soda, the latter being sufficiently in excess of that necessary to form a manganate of soda and to cause the manganate to liquefy at a temperature below that which decomposes steam, substantially as set forth.

5. The herein-described preparation consisting of a manganate and an alkali in substantially equal proportions, said preparation being capable of remaining liquefied at a temperature below that which decomposes steam, substantially as set forth.

6. The herein-described process of reducing a manganate to a liquid condition, the same consisting in subjecting oxid of manganese together with an alkali in excess of the quantity necessary to form a manganate to a liquefying temperature, substantially as set forth.

7. The herein-described process of reducing a manganate to a liquid condition, the same consisting in subjecting oxid of manganese together with caustic alkali in excess of the quantity necessary to form a manganate to a liquefying temperature, substantially as set forth.

8. The herein-described process of reducing a manganate to a liquid condition, the same consisting in subjecting oxid of manganese together with caustic soda in excess of the quantity necessary to form a manganate to a melting temperature, substantially as set forth.

9. The herein-described method of rendering a manganese preparation permanently liquid and non-volatile and susceptible to the action of steam, the same consisting in adding to a manganate an excess of alkali sufficient to maintain the manganate in liquid solution at a temperature above that at which steam forms and below the temperature which decomposes steam, and maintaining the solution between such temperatures, substantially as set forth.

10. The herein-described method of making an oxygen and nitrogen separating substance, which will be fusible at a temperature below that which decomposes steam, which consists in heating oxid of manganese and caustic soda in the presence of oxygen at a temperature between that at which a manganate forms and that which decomposes steam and adding caustic soda until the mass becomes liquid, substantially as set forth.

ERNEST B. STUART.

Witnesses:
CHARLES S. CORNING,
F. A. HOPKINS.